April 24, 1962 T. L. DIMOND ETAL 3,031,135

ELAPSED TIME RECORDER STAMP IMPRESSION READER

Filed June 9, 1959 2 Sheets-Sheet 1

INVENTORS: T. L. DIMOND
A. C. WYCKOFF
BY Kenneth B. Hamlin
ATTORNEY

ELAPSED TIME RECORDER STAMP IMPRESSION READER

Filed June 9, 1959 2 Sheets-Sheet 2

INVENTORS: T. L. DIMOND
A. C. WYCKOFF

BY Kenneth B Hamlin

ATTORNEY 3,031,135

ELAPSED TIME RECORDER STAMP IMPRESSION READER

Thomas L. Dimond, Chatham, and Albert C. Wyckoff, Madison, N.J., assignors to Bell Telephone Laboratories, Incorporated, New York, N.Y., a corporation of New York Filed June 9, 1959, Ser. No. 819,144
6 Claims. (Cl. 235—61.6)

Figure 1:
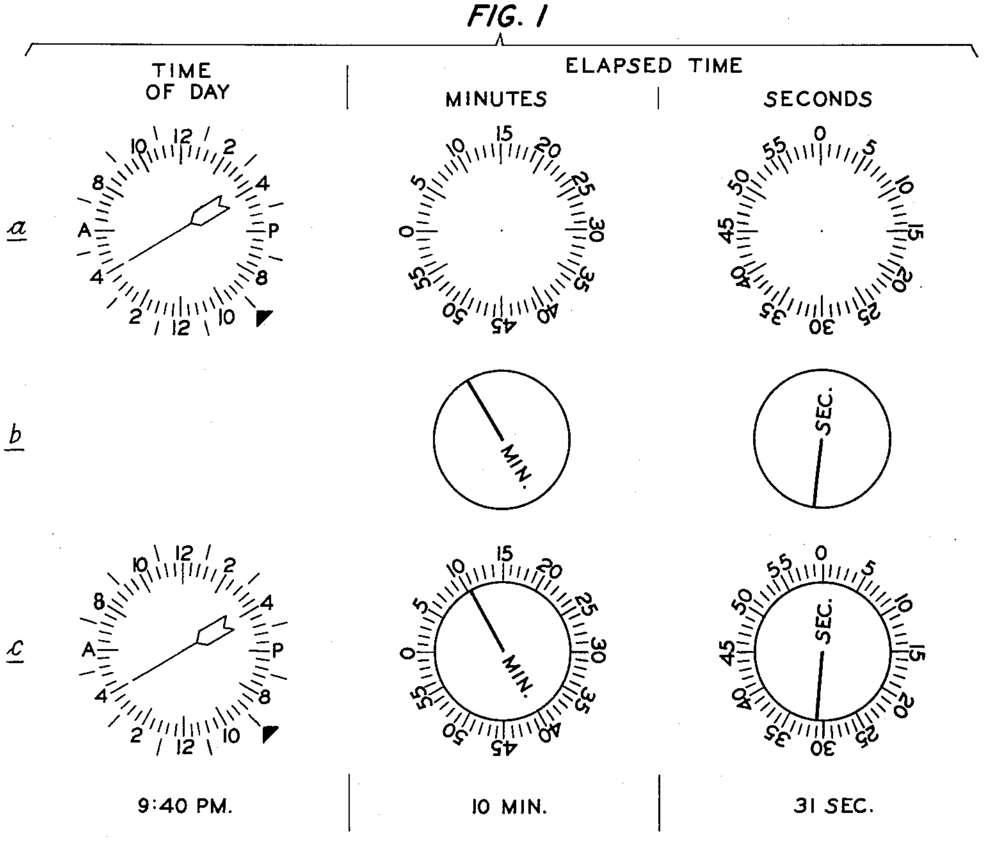

This invention relates to pattern recognition systems and more particularly to such systems for automatically reading the clock-like stamp impressions of elapsed time recorders.

In today's telephone central offices, toll message charging information is furnished to accounting personnel in two ways. Those offices which are equipped with direct distance dialing equipment and its associated automatic message accounting equipment furnish this information on punched tapes or magnetic tapes which are automatically processed to prepare a customer's telephone bill. Although the introduction of automatic message accounting equipment has greatly facilitated the processing of toll message charging information, still a major portion of this information because of its very nature is manually prepared by telephone operators. For example, the toll message charging information on person-to-person calls, calls for which time and charge are supplied by an operator at the completion of the call, collect calls, and calls on which the customer desires notification when the initial period has elapsed, still require the assistance of an operator. The toll message charging information on these types of calls and on all toll calls from central offices which are not equipped with direct distance dialing equipment and associated automatic message accounting equipment is manually written on toll tickets by the telephone operators handling the calls. These toll tickets contain handwritten information giving the town and state of the called party, the central office and directory number of the called party, and the central office and directory number of the calling party. In addition, the time that the call was placed and the duration of the call are stamped on the toll ticket by an elapsed time recorder. One such elapsed time recorder, which is extensively utilized in the telephone industry, is a recorder known generally as a "Calculagraph" (a trademark of the Calculagraph Company, Harrison, New Jersey). As early as the late nineteenth century, "Calculagraphs" were installed on toll switchboards in telephone central offices to record the connect time and duration of telephone calls. At the present time there are many thousands of "Calculagraph" elapsed time recorders installed in telephone central offices throughout the country. Although the "Calculagraph" has been modernized and improved since the first models were installed in telephone switchboards, basically the connect time and duration of calls are recorded in the same manner. Reference is made to an article entitled "The Calculagraph in Telephone Service" appearing at page 297 in the December 21, 1895 issue, volume XVII, No. 25, of the Western Electrician. This article describes the early "Calculagraph" installed in telephone switchboards. Reference is also made to a recent article entitled "Measuring Time in Central Offices" by R. F. Ewald and E. P. Williams which appeared in the November, 1958 issue, volume 36, No. 11, of the Bell Laboratories Record. This article describes, inter alia, the modern "Calculagraph" installed in telephone switchboards today. A comparison of these two articles, which were written sixty-three years apart, clearly indicates that the manner of recording the connect time and duration of telephone calls by means of a "Calculagraph" has basically remained unchanged. Both the early and modern "Calculagraph" are clock-like mechanisms with printing elements which include three pointer-dial combinations, one for the time of day, a second for elapsed time in minutes, and a third for elapsed time in seconds. These pointer-dial printing elements when actuated by associated levers cooperate with an inked ribbon to print stamp impressions on a toll ticket. On the time-of-day indicator the dial printing element is stationary and the two pointer printing elements, one for hours and one for minutes, rotate continuously in a clocklike fashion. The minutes and seconds elapsed time indicators each includes dial and pointer printing elements which rotate together continuously but which are actuated separately to print the stamp impressions thereof. When the timing of a call by a "Calculagraph" has been completed, the toll ticket inserted therein will contain three stamp impressions of the pointer-dial combination printing elements, one from which the connect time of the call can be ascertained and the other two from which the duration of the call in minutes and seconds can be ascertained.

The toll tickets prepared by operators in the manner described above are at the present time processed manually. This involves the reading of the duration of the call for which each toll ticket was prepared, the calculation of the appropriate charge for the call, and the manual entry of this information on the toll ticket. The toll tickets are then manually sorted into calling number order and are utilized to calculate each subscriber's telephone bill. Each year several billion toll tickets are manually processed in this manner, and it is readily apparent that, if this manual processing were mechanized, substantial savings in money, time and personnel could be realized.

Various systems have been priorly proposed for the automatic machine reading of handwritten alphabetical letters and Arabic numerals. These systems enable the automatic reading of the handwritten information entered on the toll tickets and will greatly facilitate the mechanization of the processing of toll tickets. Such systems, for example, are disclosed in the copending applications of T. L. Dimond, Serial No. 678,213, filed August 14, 1957, and L. A. Kamentsky, Serial No. 806,255, filed April 14, 1959. The full mechanization of the processing of toll tickets in telephone central offices, however, has not heretofore been attained because of the necessity for manually reading and translating the "Calculagraph" stamp impressions to determine the duration of the call for which each toll ticket was prepared. It is thus apparent that the necessity for manually translating the "Calculagraph" stamp impressions which appear on each toll ticket is the "bottleneck" which prevents the complete mechanization of the processing of toll message charging information. Modern high-speed computers and data processing systems are capable of processing data at high rates of speed, but because the processing of toll message charging information is dependent upon the slow and costly manual translation of "Calculagraph" stamp impressions these high rates of data processing have not heretofore been attainable.

It is an object of the present invention to increase the efficiency and reliability and to reduce the cost of processing toll message charging information in telephone central offices.

It is a further object of the present invention to eliminate the manual translating and sorting operations heretofore required in the processing of toll message charging information.

It is also an object of the present invention to provide apparatus for automatically reading and translating into machine language the stamp impressions of "Calculagraph" elapsed time recorders.

These and other objects of the present invention are attained in an illustrative embodiment wherein a flying spot scanner is controlled to scan the field of a "Calculagraph" stamp impression in a first circular scan concentric with and outside the dial of the stamp impression and in a second circular scan concentric with and inside the dial of the stamp impression. A photosensitive element, responsive to light reflections from the scanned field, detects the position of the zero line of the dial stamp impression during the first circular scan and the position of the elapsed time pointer stamp impression during the second circular scan and controls means for converting the angular difference between these respective positions into machine language corresponding to the elapsed time represented thereby.

It is a feature of the present invention that a "Calculagraph" stamp impression be scanned by a scanner to determine the elapsed time represented thereby.

It is another feature of the present invention that a scanner scan a "Calculagraph" stamp impression to determine the angular difference between the position of the zero line of the dial stamp impression and the position of the elapsed time pointer stamp impression.

It is a further feature of this invention that the angular difference between the position in a "Calculagraph" stamp impression of the zero line of the dial stamp impression and and the elapsed time pointer stamp impression be utilized to produce a signal corresponding to the elapsed time represented thereby.

Figure 2:
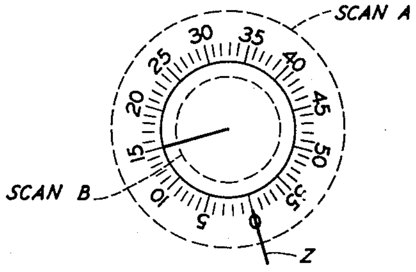

The foregoing and other objects and features of the present invention will be more readily understood from the following description of an illustrative embodiment thereof when read with reference to the accompanying drawing, in which:

FIG. 1 depicts an enlarged pictorial representation of typical stamp impressions made by a "Calculagraph" elapsed time recorder;

FIG. 2 depicts an illustrative enlarged pictorial representation of an elapsed time indicator stamp impression made by a "Calculagraph" which has been modified to facilitate the machine reading of the stamp impressions made thereby. The two circular scan paths utilized in accordance with the present invention in the reading of stamp impressions are shown in dotted lines; and FIG. 3 is a simplified block diagram schematic of an illustrative embodiment of a "Calculagraph" stamp reader in accordance with the invention.

In order to provide a better understanding of the present invention, a brief description of the operation of a "Calculagraph" to provide stamp impressions on a toll ticket indicating the connect time and duration of a call will be given with reference to FIG. 1. As indicated hereinbefore, a "Calculagraph" has three pointer-dial combination printing elements, one for the time of day in hours and minutes, and two for elapsed time, one in minutes and one in seconds. When a operator inserts a toll ticket into a "Calculagraph" and operates a lever at the connect time of a call, the time-of-day indicator dial and pointer printing elements are actuated to print stamp impressions of both the dial printing element and the hour and minute pointer printing elements on the toll ticket as shown at *a* in FIG. 1, to indicate the time of day that the call was established. At the same time, the dial printing elements of the minutes and seconds elapsed time indicators are actuated to print stamp impressions of the dials only on the toll ticket also as shown at *a* in FIG. 1. After stamping the impression shown at *a* in FIG. 1 on the toll ticket, the operator removes the toll ticket from the "Calculagraph" and waits for the termination of the call. When disconnect occurs the operator reinserts the toll ticket into the "Calculagraph" and operates a lever which controls the elapsed time pointer printing elements of the minutes and seconds elapsed time indicators to print stamp impressions thereof shown at *b* in FIG. 1 onto the previously printed dial stamp impressions. The completed stamp impression of the time of day and elapsed time for the call is shown at *c* in FIG. 1. In the example shown in FIG. 1, the call was placed at 9:40 p.m. and lasted for 10 minutes and 31 seconds.

To facilitate the automatic machine reading of "Calculagraph" stamp impressions of the type shown at *c* in FIG. 1, in accordance with the present invention, the elapsed time indicator dial printing elements of the "Calculagraph" are modified so as to print a stamp impression similar to that shown in FIG. 2. It will be observed, referring to FIG. 2, that the line denoting the zero line on the dial has been extended radially so as to be detectable by a scanner scanning the stamp impression in a circular pattern. Thus when the "Calculagraph" dial printing elements of the minutes and seconds elapsed time indicators are modified to provide stamp impressions of the type shown in FIG. 2, these stamp impressions may advantageously be read in accordance with the present invention to determine automatically the duration of a call.

Figure 3:
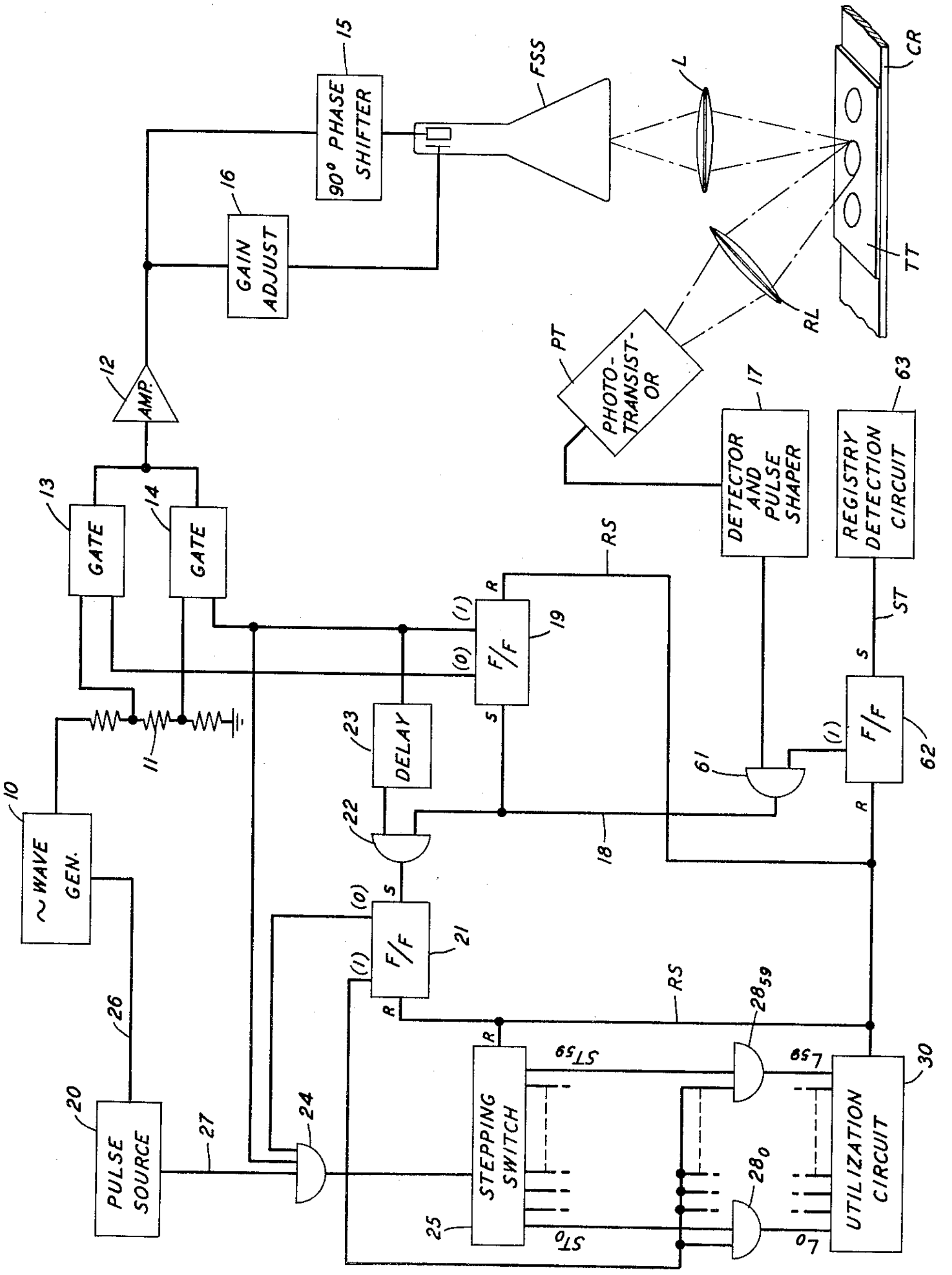

As shown in FIG. 3, the "Calculagraph" stamp reader in accordance with the present invention includes a flying spot scanner FSS, the light spot of which is focused by lens L on the field of a "Calculagraph" stamp impression appearing on a toll ticket designated TT. Flying spot scanner FSS is controlled to scan the field of a "Calculagraph" stamp impression in two circular scans concentric with the dial of the stamp impression. The first of these circular scans, identified as scan A in FIG. 2, is concentric with and outside the dial stamp impression, and the second, identified as scan B in FIG. 2, is concentric with and inside the dial stamp impression.

The control of cathode ray tubes to generate a circular scan is well known in the art and may be accomplished in a number of ways. Reference is made to pages 132 through 136 of the book "Waveforms," M.I.T. Radiation Laboratories Series, volume 19, published by McGraw-Hill Book Company, Incorporated, in 1949, for several of the known ways of generating a circular sweep in a cathode ray tube. As described in this publication, one of the known methods is to apply two equal sinusoidal voltages which vary in phase by 90 degrees to the deflection plates of the cathode ray tube, and this method is utilized in the illustrative embodiment of the invention to control flying spot scanner FSS to generate the two above-described circular scans. A sinusoidal voltage generated by sine wave generator 10 is applied to a voltage divider comprising tapped resistance 11 from which two different amplitude sinusoidal voltages are selected. The larger of these voltages is applied through gate 13 to amplifier 12 and the smaller is applied through gate 14 to amplifier 12. The selected sinusoidal voltage from the output of amplifier 12 is applied through a 90-degree phase shifter 15 to one set of deflection plates of flying spot scanner FSS. The same sinusoidal voltage obtained from amplifier 12 is also applied through gain adjust circuit 16 to the other set of deflection plates of flying spot scanner FSS. Gain adjust circuit 16 permits the amplitude of the sinusoidal voltage from the output of amplifier 12 to be adjusted in order to overcome any losses encountered in the 90-degree phase shifter 15 to permit the light spot of flying spot scanner FSS to describe a substantially true circle on the toll ticket or paper upon which the "Calculagraph" stamp impression is printed. These two sinusoidal voltages, one larger in amplitude than the other, are selectively applied to amplifier 12 by the selective operation of gates 13 and 14. When gate 13 is actuated, as will be described, the sinusoidal voltage from the output of amplifier 12 will cause flying spot scanner FSS to generate circular scan A shown in FIG. 2. When gate 14 is actuated and gate 13 is normal or closed, as will be described, the sinusoidal voltage from the output of amplifier 12 will cause flying spot scanner FSS to generate circular scan B shown in FIG. 2.

The light reflections from the scanned field are focused by lens RL on phototransistor PT. Phototransistor PT sees a continuous light reflection as the light spot of flying spot scanner FSS traces either of the circular scans A and B. When either of the scans intersects a mark, the light intensity reflected to phototransistor PT will be reduced. The output of phototransistor PT applied to detector and pulse shaper circuits 17 is a voltage which has a specific direct-current level until a mark is detected. As a scan passes over a mark the output of phototransistor PT will be a pulse with a negative direction. This pulse is detected in detector and pulse shaper circuits 17 where it is amplified and shaped in the manner known in the art and applied to one input of AND gate 61. When AND gate 61 is enabled as will be described below, it will apply a pulse to lead 18 in response to the pulse from detector and pulse shaper circuits 17. This pulse on lead 18 is applied to the set input of flip-flop 19. When flip-flop 19 is in its normal or reset condition, the signal from the (0) output lead of flip-flop 19 will cause the actuation of gate 13. However, when flip-flop 19 is in its operated or set condition the signal is removed from the (0) output lead and a signal is applied to the (1) output lead from this flip-flop. Thus gate 13 is closed and gate 14 is opened. Flip-flop 19 is reset by a signal applied to the RS lead, as will be described later.

The angular difference in a "Calculagraph" stamp impression between the position of the elongated zero line designated Z in FIG. 2 of the dial stamp impression and the position of the elapsed time pointer stamp impression is determined, in accordance with the present invention, by flying spot scanner FSS and the associated circuits described above. With flip-flop 19 in its normal or reset condition, a toll ticket designated TT upon which a "Calculagraph" stamp impression appears is placed on a carriage CR and moved into the field of flying spot scanner FSS by any suitable means. The relative position between the stamp impression and the light spot is then adjusted, in a manner also known in the art, either by controlling the electron beam of flying spot scanner FSS or by changing the location of carriage CR until toll ticket TT is positioned with respect to the light spot of flying spot scanner FSS such that flying spot scanner FSS will scan a path designated scan A in FIG. 2 which is concentric with and outside the dial of the "Calculagraph" stamp impression. The correct registration of toll ticket TT with respect to flying spot scanner FSS is detected in a known manner by registry detection circuit 63 which in response thereto applies a signal pulse over lead ST to operate or set flip-flop 62 to the set condition. With flip-flop 62 in its set condition, a voltage is applied from its (1) output to enable AND gate 61.

When the elongated zero line designated Z of the dial is intersected by the light spot of flying spot scanner FSS, a signal pulse is applied through AND gate 61 to lead 18 as described above by detector and pulse shaper circuits 17. The signal pulse on lead 18 sets flip-flop 19 to its operated condition which results in the operation of gate 14 as described above. When gate 14 is operated, the smaller amplitude sinusoidal voltage is applied to amplifier 12 and flying spot scanner FSS traces a circular scan designated scan B in FIG. 2 which is concentric with and inside the dial of the stamp impression. When the elapsed time pointer of the "Calculagraph" stamp impression is intersected during scan B, a second signal pulse is applied through AND gate 61 to lead 18 by detector and pulse shaper circuits 17, and thus the elapsed time between the application of the pulse to lead 18 during scan A and the pulse applied to lead 18 during scan B corresponds to the angular difference between the elongated zero line Z of the dial and the elapsed time pointer of the "Calculagraph" stamp impression.

In accordance with another aspect of the present invention, the angular difference in a "Calculagraph" stamp impression between the elongated zero line Z of the dial and the elapsed time pointer is utilized to produce a signal which corresponds to the elapsed time represented by the "Calculagraph" stamp impression. This is accomplished in the illustrative embodiment shown in FIG. 3 by circuitry comprising pulse source 20, flip-flop 21, AND gate 22, delay circuit 23, AND gate 24, stepping switch 25, and AND gates $28_0$ through $28_{59}$.

Pulse source 20 may be any type of pulse source known in the art which is synchronized to the frequency of sine wave generator 10 via lead 26. Pulse source 20 applies a plurality of signal pulses to lead 27 for each cycle of sinusoidal voltage generated by sine wave generator 10. In the illustrative embodiment of the present invention, pulse source 20 produces 60 signal pulses for each cycle of sinusoidal voltage produced by sine wave generator 10. In this manner the time required for flying spot scanner FSS to make one complete circular scan is divided into 60 equal intervals.

Pulse source 20 may advantageously comprise, as is known in the art, a harmonic generator which in response to the sinusoidal signal from sine wave generator 10 over lead 26 produces harmonics of the sinusoidal frequency of sine wave generator 10. The 60th harmonic is selected by means of suitable filters, amplified, and shaped in pulse shaping circuits, also well known in the art, to produce signal pulses which are applied to lead 27. Alternatively, pulse source 20 may generate pulses at a rate which is 60 times the frequency desired from the output of sine wave generator 10. With this arrangement sine wave generator 10 may advantageously include a sub-multiple generator which is controlled by the signal pulses applied over lead 26 to generate a sinusoidal voltage one-sixtieth of the pulse repetition frequency of pulse source 20. The output of pulse source 20 on lead 27 accordingly is a succession of signal pulses which are applied to an input of AND gate 24.

When AND gate 24 is actuated, as will be described, the pulses present on lead 27 are applied to the input of stepping switch 25 which in response thereto successively applies a signal pulse to each of the 60 output leads $ST_0$ through $ST_{59}$ therefrom. In other words, the first pulse applied from the output of AND gate 24 after its actuation will cause a pulse to be applied to the $ST_0$ lead from the output of stepping switch 25. The next pulse will be applied to the $ST_1$ lead, et cetera, until the 60th pulse is applied to output lead $ST_{59}$ of stepping switch 25. The output leads $ST_0$ through $ST_{59}$ from stepping switch 25 are each connected to an associated AND gate such as AND gate $28_0$ for the $ST_0$ lead and AND gate $28_{59}$ for the $ST_{59}$ lead. One input of each of these AND gates is connected to the (1) output lead of flip-flop 21, and accordingly when flip-flop 21 is in its operated or set condition a signal on the (1) output lead therefrom will enable each of the AND gates in the output leads of stepping switch 25. The AND gate in the particular one of the output leads $ST_0$ through $ST_{59}$ to which a signal pulse is applied by stepping switch 25 when flip-flop 21 is operated to its set condition will be actuated to apply a signal pulse to its corresponding output lead $L_0$ through $L_{59}$ which extends to the utilization circuit 30 to indicate the elapsed time read from the "Calculagraph" stamp impression. Utilization circuit 30 may advantageously be a register circuit for registering the elapsed time, a magnetic recorder for recording the elapsed time on a magnetic drum or magnetic tape, or a card punch device for punching an information card in the manner known in the art.

When the pulse is applied through AND gate 61 to lead 18 from detector and pulse shaper circuits 17 during scan A, flip-flop 19 is operated to its set condition as described above. This causes a signal to be applied from the (1) output lead of flip-flop 19 to operate gate 14 to change the diameter of the scan from scan A to scan B. The signal applied to the (1) output lead of flip-flop 19 is applied through delay circuit 23 to the upper input of AND gate 22. The purpose of delay circuit 23 is to prevent the actuation of AND gate 22 in response to the signal pulse applied to lead 18 during scan A. This signal is also applied to an input of AND gate 24. The other input of AND gate 24 is connected to the (0) output lead of flip-flop 21. This lead is an enabling lead and accordingly with flip-flop 21 in its normal condition AND gate 24 will be actuated to apply the successive pulses to stepping switch 25 as described above. To summarize, when the zero line Z of the dial stamp impression is detected during scan A, AND gate 24 will be actuated and will start applying signal pulses to stepping switch 25. When the elapsed time pointer is detected during scan B, the pulse applied to lead 18 is applied again to the set input of flip-flop 19. However, because this flip-flop is already in its operated condition this pulse has no effect on flip-flop 19. The second pulse, however, will cause the actuation of AND gate 22. The other input of AND gate 22 will be enabled at this time by the signal applied through delay circuit 23 when flip-flop 19 was set by the previous signal pulse applied to lead 18 during scan A.

The actuation of AND gate 22 will set flip-flop 21 to its operated or set condition. When this occurs the enabling signal applied to the (0) output lead of flip-flop 21 is removed and hence AND gate 24 is disabled. Thus the pulses applied to stepping switch 25 from pulse source 20 are halted. When flip-flop 21 is operated to its set condition, a signal is applied from its (1) output lead, as described above, to the AND gates such as AND gates $28_0$ and $28_{59}$ in the output leads of stepping switch 25. The AND gate connected to the particular one of these leads which has a signal pulse applied thereto by stepping switch 25 will be actuated to apply a signal to utilization circuit 30. When utilization circuit 30 recognizes this signal and performs the required operation in response thereto (registering, recording, or card punching, as indicated above), it applies a reset signal over the RS lead to reset stepping switch 25 to its zero position and to reset flip-flops 19, 21, and 62 to their normal or reset condition in preparation for reading a succeeding "Calculagraph" stamp impression. Thus, for example, if the minutes elapsed time indicator stamp impression was scanned and the time interval between the detection of the elongated zero line Z and the elapsed time pointer of the "Calculagraph" stamp impression is sufficient to allow 31 sequential pulses to be applied through AND gate 24 to stepping switch 25, a signal pulse will be applied over output lead $L_{31}$, not shown in the drawing, to utilization circuit 30 to indicate that the elapsed time recorded by the stamp impression is 31 minutes. In a similar manner, if the seconds elapsed time indicator stamp impression was scanned, the signal applied over output lead $L_{31}$ to utilization circuit 30 indicates that the elapsed time recorded by the stamp impression is 31 seconds.

The foregoing description clearly indicates the manner in accordance with the invention by which "Calculagraph" stamp impressions are automatically read. It is to be understood that both the minutes and seconds elapsed time indicators may be read in this manner. These may be successively read by the same equipment, or two equipments similar to that shown in FIG. 3 may be utilized simultaneously to read the minutes and seconds elapsed time indicator stamp impressions at the same time. Although the present invention has been described with reference to the automatic reading of "Calculagraph" stamp impressions, it is to be understood that any similar type of stamp impression made by any type of recorder may also advantageously be read.

It is also to be understood that the above-described arrangements are illustrative of the application of the principles of the present invention. Numerous other arrangements may be devised by those skilled in the art without departing from the spirit and scope of the invention.

What is claimed is:

1. In a reader for automatically reading an elapsed time recorder stamp impression, said stamp impression comprising a dial with time calibrations including a distinctive zero time line extending radially from said dial and an elapsed time pointer inside said dial and directed toward the calibration denoting the elapsed time measured by said recorder, the combination comprising scanning means for scanning a field which includes said stamp impression, sensing means operative in response to the intersection by said scanning means of a mark on said field, means controlling said scanning means to make a first circular scan concentric with and outside said dial, first means controlled by said sensing means operative when said scanning means intersects said zero time line, means controlled by said first means when operated for controlling said scanning means to make a second circular scan concentric with and inside said dial, second means controlled by said sensing means operative when said scanning means intersects said elapsed time pointer, means dividing said circular scans of said scanning means into a plurality of equal time intervals, and means controlled by said first means and said second means for counting the number of said time intervals that occur between the intersection of said zero time line and the intersection of said elapsed time pointer by said scanning means.

2. The combination defined in claim 1 in combination with means controlled by said last mentioned means for providing an output signal representing the elapsed time indicated by said stamp impression.

3. In a reader for automatically reading an elapsed time recorder stamp impression, said stamp impression comprising a dial with time calibrations including a distinctive zero time line extending radially from said dial and an elapsed time pointer inside said dial and directed toward the calibration denoting the elapsed time measured by said recorder, the combination comprising a light spot source, means for focusing the light spot of said source on a field which includes said stamp impression, means controlling said source to move said spot in a first circular scan pattern concentric with and outside said dial to scan said stamp impression for said zero time line, a light sensitive element, means for focusing the light reflected from said field on said light sensitive element, means controlled by said light sensitive element when operated in response to the light reflected from said zero time line for controlling said source to move said spot in said second circular scan pattern concentric with and inside said dial to scan said stamp impression for said elapsed time pointer, means for dividing said circular scan patterns into a plurality of equal time intervals, means controlled by said light sensitive element when operated in response to the light reflected from said elapsed time pointer for determining the number of said intervals occurring between the detection of said zero time line and the detection of said elapsed time pointer, and means controlled by said last mentioned means for producing an output signal representing the elapsed time indicated by said stamp impression.

4. In a reader for automatically reading an elapsed time recorder stamp impression, said stamp impression comprising a dial with time calibrations including a distinctive zero time line extending radially from said dial and an elapsed time pointer inside said dial and directed toward the calibration denoting the elapsed time measured by said recorder, the combination comprising scanning means for scanning a field which includes said stamp impression, means for controlling said scanning means to make a circular scan of said field concentric with and outside said dial, first means operative in response to the intersection of said zero time line by said scanning means for reducing the diameter of the circular scan made thereby so that said circular scan is concentric with and inside said dial, second means operative in response to the intersection of said elapsed time pointer by said scanning means, means for generating a predetermined plurality of equally spaced signal pulses during each 360 degrees of said circular scan, and means controlled by said first means and said second means for determining the number of said signal pulses generated between the intersection of said zero time line and the intersection of said elapsed time pointer by said scanning means.

5. The combination defined in claim 4 in combination with means controlled by said last mentioned means and responsive to said signal pulses for providing an output signal representing the elapsed time indicated by said stamp impression.

6. The combination defined in claim 4 wherein said last mentioned means comprises counting means, gate means controlled by said first means when operated for applying said signal pulses to said counting means, and means controlled by said second means when operated for disabling said gate means.

References Cited in the file of this patent

UNITED STATES PATENTS 2,393,186 Potter ------------------ Jan. 15, 1946